(12) United States Patent  
Schuettel et al.

(10) Patent No.: US 6,598,504 B2
(45) Date of Patent: Jul. 29, 2003

(54) STRUCTURE FOR A MACHINING CENTER

(75) Inventors: Patrick Schuettel, Roches (CH); Michel Frésard, Moutier (CH)

(73) Assignee: Tornos SA, Moutier (CH)

( * ) Notice: Subject to any disclaimer, the term of this patent is extended or adjusted under 35 U.S.C. 154(b) by 0 days.

(21) Appl. No.: 10/128,507

(22) Filed: Apr. 24, 2002

(65) Prior Publication Data

US 2002/0162431 A1 Nov. 7, 2002

(30) Foreign Application Priority Data

Apr. 25, 2001 (EP) .............................. 01810408

(51) Int. Cl.[7] .............................. B23B 7/00; B23B 9/00
(52) U.S. Cl. .......................................... 82/129; 82/117
(58) Field of Search ........................ 82/129, 124, 127, 82/121, 120; 29/27 R, 27 C

(56) References Cited

U.S. PATENT DOCUMENTS

| | | | | |
|---|---|---|---|---|
| 4,413,539 A | * | 11/1983 | Ishizuka et al. | 82/129 |
| 4,612,832 A | * | 9/1986 | Ushigoe et al. | 82/129 |
| 4,953,274 A | * | 9/1990 | Rehage et al. | 82/129 |
| 5,117,544 A | * | 6/1992 | Kousaku et al. | 82/129 |
| 5,896,794 A | * | 4/1999 | Trautmann | 82/129 |

* cited by examiner

*Primary Examiner*—Willmon Fridie, Jr.
(74) *Attorney, Agent, or Firm*—Oliff & Berridge, PLC

(57) ABSTRACT

A machining center comprising a frame and, borne by this frame, two devices, referred to as workpiece support devices because each allows a workpiece to be machined to be supported and driven in rotation about a control axis, this machining center being characterized in that:

each of the two workpiece support devices is supported by a device for control and for translatory displacement along a first axis, the said devices for control and for translatory displacement being actuated in such a way that each of the workpiece support devices is movable between a position of maximal distance from the opposite support device and a position of maximal bringing closer together with this opposite workpiece support device, the sum of the ranges of possible displacements of the two workpiece support devices being at least equal to the distance which separates the two workpiece support devices when they are placed in their maximal spaced apart position, the main device for holding and for displacement of at least one machining tool is disposed in such a way as to bring about the displacement of this tool at most in a plane which, on the one hand, is orthogonal to the first axis and, on the other hand, is situated between the two workpiece support devices in such a way as to bring about the machining of a workpiece borne by at least one of these workpiece support devices.

9 Claims, 2 Drawing Sheets

STRUCTURE FOR A MACHINING CENTER

BACKGROUND OF THE INVENTION

1. Field of Invention

The invention relates to a structure for a machining center. The invention concerns more specifically a lathe which comprises two devices, each for support and for driving in rotation a workpiece to be machined about a control axis, the control axes of these devices being aligned according to an axis, referred to as the first axis, and the said devices being, on the one hand, separated by a predetermined distance, and, on the other hand, being opposing, i.e. oriented so as to bring about an operation of taking, by one of the devices, of a workpiece driven by the other device.

2. Description of Related Art

Conventionally, a machining center comprises a frame, and each device for support and for driving in rotation a workpiece to be machined about a control axis is called a headstock, and consists of a device comprising:

a rigid support connected to the frame of the machine,
a workpiece spindle rotary mounted on this rigid support,
a motor for driving the spindle in rotation.

In the following description, each device for support and for driving in rotation a workpiece to be machined about a control axis will be designated by the simplified expression "workpiece support device."

Conventionally, one of the two workpiece support devices (referred to as the accessory device) is movable relative to the other (referred to as the main device), and more specifically, is borne by a device for control and for displacement toward this main workpiece support device in such a way as to bring about an operation of taking of a workpiece which has already been machined, this taking operation being carried out while the workpiece is being driven in rotation by the said main workpiece support device.

Because it has to be displaced, and rapidly displaced—all the more so in order to affect as little as possible the duration of the machining cycle—the accessory workpiece support device is selected in such a way as to have a mass that is less than that of the main workpiece support.

Selection of a workpiece support of lesser mass has a notable effect on the mechanical output power of this device and on its capacity to achieve the driving of a workpiece in rotation to allow machining operations requiring a lot of force.

There exist a number of machines of this type, the machining possibilities of which are affected by too low an output power for an accessory workpiece support device.

SUMMARY OF THE INVENTION

A result which the invention aims to obtain is in particular a machining center having workpiece support devices which, while allowing the operations referred to as taking, have appreciably the same mass and the same output power so as not to affect the productivity.

Another drawback of known machines is that the control of the displacement of the accessory workpiece support uses a slide which must be protected from particles by an appropriate device.

The protection devices used are generally of the collapsible type, and the length of the displacement of the accessory workpiece support device renders their construction relatively complex.

Another object of the invention is, in particular, simplification of the construction of the collapsible protection device.

Also an object of the invention is a machine having a structure with an increased resistance to elastic deformation.

Other results obtained by the machine according to the invention will be mentioned in the following.

The invention has as its subject matter a machine of the initially mentioned type, in particular wherein each of the two workpiece support devices is supported by a device for control and translatory displacement along a first axis, the said control and translatory displacement devices being actuated in such a way that each of the workpiece support devices movable between a position of maximal distance from the opposite support device and a position of maximal bringing closer together with this opposite workpiece support device, the sum of the ranges of possible displacements of the two devices being at least equal to the distance which separates the two workpiece support devices when they are placed in their maximal spaced apart position, the main device for holding and for displacement of at least one machining tool is disposed in such a way as to bring about the displacement of this tool at most in a plane which, on the one hand, is orthogonal to the first axis and, on the other hand, is situated between the two workpiece support devices in such a way as to bring about a machining of a workpiece borne by at least one of these workpiece support devices.

The invention will be better understood from reading the description which follows, given by way of non-limiting example, with reference to the attached drawing:

DETAILED DESCRIPTION OF EXEMPLARY EMBODIMENTS

Figure 1:
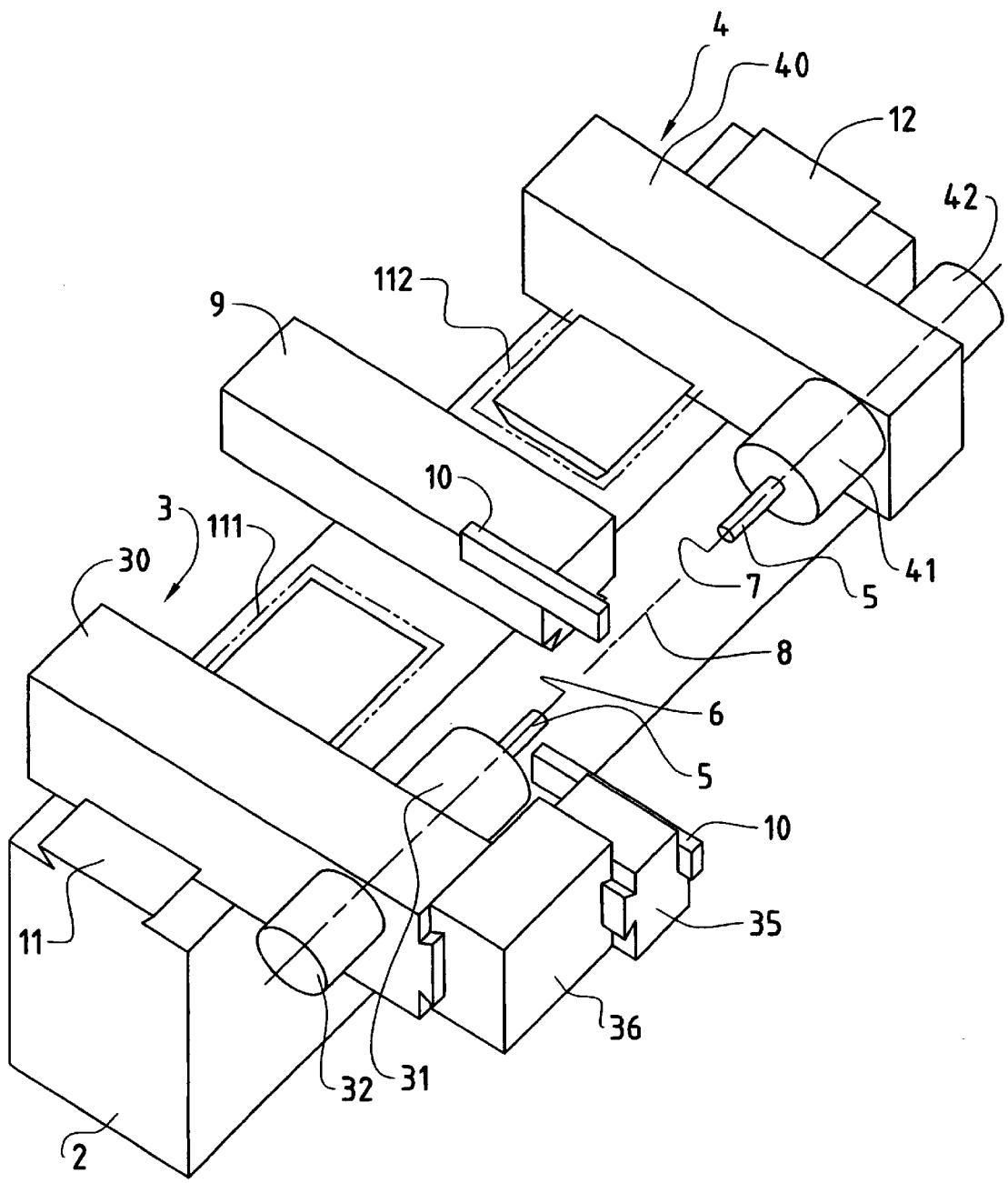
FIG. 1 shows a view in perspective of a machine according to the invention.
Figure 2:
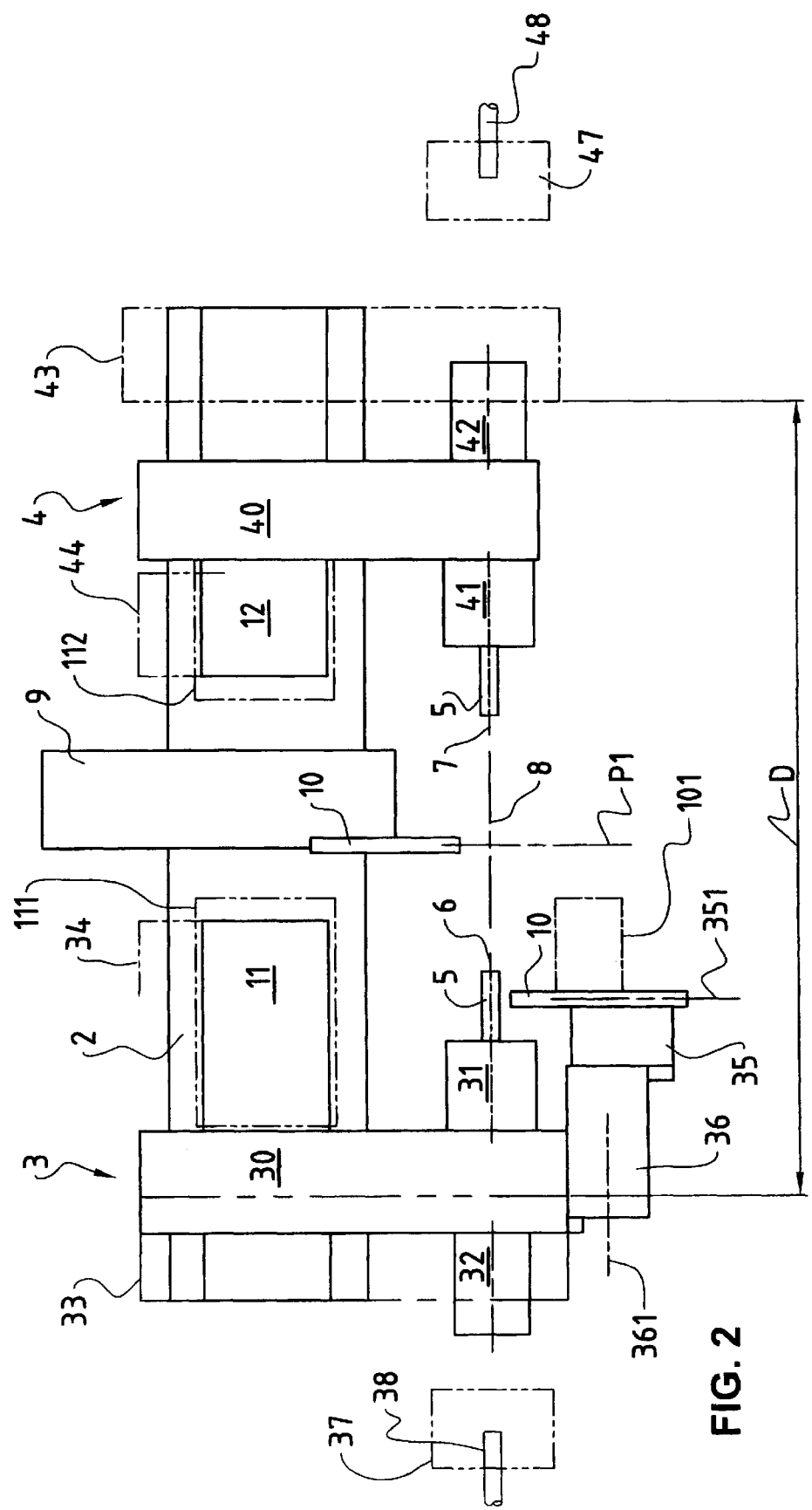
FIG. 2 shows a view from above of a machine according to the invention.

With reference to the drawing, a machining center 1 can be seen comprising a frame 2, and, borne by this frame:

two devices 3, 4, referred to as workpiece support devices 3, 4, because each allows a workpiece 5 to be machined to be supported and driven in rotation about a control axis 6, 7, the control axes 6, 7 of these workpiece support devices 3, 4 being aligned along an axis referred to as the first axis 8, and the said workpiece support devices 3, 4 being, on the one hand, separated by a predetermined distance, and, on the other hand, being opposing, i.e. oriented in such a way as to bring about an operation of taking by one 4 of the workpiece support devices 3, 4 of a workpiece 5 driven by the other workpiece support device 3, at least one main device 9 for holding and for displacement of at least one machining tool 10 relative to the workpiece support devices 3, 4 in such a way as to allow the machining of a workpiece 5 borne by at least one of these workpiece support devices 3, 4.

Conventionally, each workpiece support device 3, 4 comprises a device which includes:

a rigid support 30, 40 connected to the frame 2 of the machining center 1, a workpiece spindle 31, 41 rotary mounted on this rigid support 30, 40, a motor 32, 42 for driving the spindle 31, 41 in rotation. In a noteworthy way:

each of the two workpiece support devices 3, 4 is supported by a device 11, 12 for control and translatory displacement along the first axis 8, the said control and translatory displacement devices 11, 12 being actuated in such a way that each of the workpiece support devices 3, 4 is movable between a position 33, 43 of maximal distance from the opposite support device and a position 34, 44 of maximal bringing closer together with this opposite workpiece support device 3, 4, the sum of the ranges of possible displacements of the two devices 3, 4 being at least equal to the distance which separates the two workpiece support devices 3, 4 when they are placed in their maximal spaced apart position 33, 43, the main device 9 for holding and for displacement of at least one machining tool 10 is disposed in such a way as to bring about the displacement of this tool 10 at most in a plane P1 which, on the one hand, is orthogonal to the first axis 8, and, on the other hand, is situated between the two workpiece support devices 3, 4 in such a way as to bring about a machining of a workpiece 5 borne by at least one of these workpiece support devices 3, 4.

Although this does not appear prominently in the drawings, each device 11, 12 for control and for translatory displacement is protected, in particular from contact with particles detached during the machining, by means of a collapsible protection device 111, 112.

On the machining center 1 according to the invention, the bringing closer together of the opposite workpiece support devices 3, 4 results in displacement of the two devices 3, 4, which makes it possible to free oneself, at least in part, of:

the inertia of one of the workpiece support devices 3, 4, i.e. to make possible use of a device 3, 4 whose size and thus correlatively the mass and the output power are increased, the complexity of each of the devices 111, 112 of collapsible protection, whose length could be reduced to half compared to those of prior art machining centers.

In a preferred embodiment, the machining center 1 according to the invention is noteworthy in that at least one of the two workpiece support devices 3, 4 bears at least one supplementary device 35, said first supplementary device, for holding and for displacement of at least one machining tool 10 in at least one predetermined direction 351, said first direction.

The fact that the supplementary device 35 for support and for displacement is borne by at least one of the two workpiece support devices 3, 4 allows in particular increase of the resistance to elastic deformation of the machining center 1 according to the invention.

In one embodiment, the machining center 1 according to the invention is noteworthy in that the said first supplementary device 35 for holding and displacement of at least one machining tool 10 ensures the control and the displacement of this tool 10 at least in the said first direction 351 which is parallel to the plane P1 of displacement of the tool 10 of the main holding and displacement device 9.

In a preferred embodiment, the machining center 1 according to the invention is noteworthy in that it comprises two supplementary devices 35, 36, said first and second supplementary devices, for holding and displacement of at least one machining tool 10 which are borne one by the other in such a way as to ensure the control and the displacement of the tool 10 in at least two directions 351, 361, said first and second directions which are perpendicular to one another.

In a preferred embodiment, the machining center 1 according to the invention is noteworthy in that each of the two workpiece support devices 3, 4 bears at least one supplementary device 35, said first supplementary device, for holding and displacement of at least one machining tool 10 in at least one predetermined direction 351, said first direction.

As symbolized in the drawings, the machining center according to the invention is equipped with two feeding devices 37, 47, each delivering bars 38, 48 of material to one of the two workpiece support devices 3, 4. Each of the two workpiece support devices 3, 4 of the machining center according to the invention can thus be advantageously used separately from the other, like a workpiece support device 3, 4 of a separate machine. This further increases the capacities of the machine.

The machining center according to the invention is noteworthy furthermore in that at least one supplementary holding and displacement device 35, 36, which it comprises, bears at least one apparatus 101 for prehension of a workpiece 5. This technical feature makes it possible to increase the serviceability of the machine by making possible the loading of workpieces onto the workpiece support device 3, 4 which is thus equipped. The technical features of the apparatus 101 for grasping or seizing of a workpiece 5 are not specified here since they are known to one skilled in the art.

What is claimed is:

1. A machining center comprising:

a frame;

said frame bearing first and second workpiece support devices, each workpiece support device configured to allow a workpiece to be machined and supported, and driven in rotation about a control axis;

the control axes of said workpiece support devices being aligned along an axis referred to as the first axis;

said workpiece support devices being separated by a predetermined distance, and, oriented to bring about an operation of taking by one of the workpiece support devices of a workpiece driven by the other workpiece support device, at least one main device holding and displacing at least one machining tool relative to said workpiece support devices in such a way as to allow the machining of a workpiece borne by at least one of the workpiece support devices, each of the workpiece support devices is supported for control and translatory displacement along the first axis in such a way that the workpiece support devices are movable away from each other and closer to each other, the sum of the ranges of possible displacements of the two workpiece support devices being at least equal to the distance which separates the two workpiece support devices when they are placed in their maximal distance apart, the main device being disposed to displace a machining tool in a plane which is orthogonal to the first axis, and situated between the workpiece support devices to machine a workpiece borne by at least one of the workpiece support devices.

2. The machining center according to claim 1, wherein at least one of the two workpiece support devices bears at least one supplementary device, said supplementary device holding and displacing at least one machining tool in at least one predetermined direction.

3. The machining center according to claim 1, wherein at least one of the workpiece support devices bears at least one supplementary device, said at least one supplementary device holding and displacing at least one machining tool in at least one predetermined direction, said at least one supplementary device controlling and displacing said at least one machining tool at least in the said predetermined direction which is parallel to the plane of displacement of the tool borne by at least one of the workpiece support devices.

4. The machining center according to claim 1, wherein at least one of the workpiece support devices bears a first and second supplementary device, each holding and displacing at least one machining tool in predetermined first and second directions, said first and second supplementary devices being borne to control and displace the at least one machining tool in at least two directions perpendicular to one another, one of these directions, said first direction, being parallel to the plane of displacement of the tool borne by at least one of the workpiece support devices.

5. The machining center according to claim 1, wherein each of the workpiece support devices bears at least one supplementary device that holds and displaces at least one machining tool in at least one predetermined direction.

6. The machining center according to claim 1, wherein the workpiece support devices bears at least one supplementary device to hold and displace at least one machining tool in at least one predetermined direction, said at least one supplementary device controlling and displacing said at least one machining tool at least in the said predetermined direction which is parallel to the plane of displacement of the tool borne by at least one of the workpiece supporting devices.

7. The machining center according to claim 1, wherein the two workpiece support devices bear first and second supplementary devices that hold and displace at least one machining tool in two predetermined directions, a first and second direction, said first and second supplementary devices borne to ensure the control and the displacement of the at least one machining tool in at least two directions perpendicular to one another, one of these two directions, said first direction, being parallel to the plane of displacement of the tool borne by the at least one of the workpiece support devices.

8. The machining center according to claim 1, wherein it is equipped with two feeding devices, each delivering bars of material to one of the two workpiece support devices.

9. The machining center according to claim 1, wherein at least one supplementary holding and displacement device which it comprises bears at least one apparatus for prehension of a workpiece.

* * * * *